UNITED STATES PATENT OFFICE.

HARRY ORLANDO HICKMAN WENMAN, OF BISHOP'S CASTLE, ENGLAND.

MANUFACTURE OF PHOSPHORUS.

1,274,479.  Specification of Letters Patent.  Patented Aug. 6, 1918.

No Drawing.  Application filed December 7, 1917. Serial No. 205,992.

*To all whom it may concern:*

Be it known that I, HARRY ORLANDO HICKMAN WENMAN, subject of the King of Great Britain, residing at Bishop's Castle, in the county of Salop, England, have invented a new and useful Improvement in the Manufacture of Phosphorus; and I do hereby declare the following to be a full, clear, and exact description of the same.

My invention comprises improvements in the manufacture of phosphorus.

Hitherto it has been the common practice to manufacture phosphorus by charging the phosphates together with silica and carbon into a gas tight furnace, the whole being then heated electrically to a temperature of from 1,300 to 1,500 degrees centigrade. The following reaction then occurs:

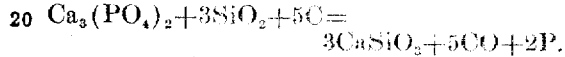

$$Ca_3(PO_4)_2 + 3SiO_2 + 5C = 3CaSiO_3 + 5CO + 2P.$$

The phosphates are usually in the form of bone ash, rock phosphates or basic slag and are charged cold which involves the utilization of very considerable heat.

The object of the present invention is to cheapen the preparation of phosphorus and in accordance therewith I utilize basic slag in a molten state direct from the steel furnace.

The molten slag may be treated in an electrically heated furnace in the same manner as solid slag; the heat required for reheating is saved with estimated saving of quite 90% of the current and a still greater saving in the cost of production. A lower grade of slag may also be used.

What I claim then is:

1. In the manufacture of phosphorus, adding molten slag to silicate and carbon in an electric furnace.

2. In the manufacture of phosphorus, running molten slag direct from a steel furnace into an electric furnace, supplying silicate and carbon to the electric furnace, and maintaining the furnace at the temperature required to vaporize the phosphorus.

3. In the manufacture of phosphorus, supplying silicate to an electric furnace, running molten slag direct from a steel furnace into said electric furnace and introducing carbon into said electric furnace.

In testimony whereof I have signed my name to this specification.

HARRY ORLANDO HICKMAN WENMAN.